United States Patent
Klenk et al.

(10) Patent No.: US 9,311,216 B2
(45) Date of Patent: Apr. 12, 2016

(54) DEFINING MULTI-CHANNEL TESTS SYSTEM AND METHOD

(71) Applicant: International Business Machines Corporation, Armonk, NY (US)

(72) Inventors: Peter H. Klenk, North Chelmsford, MA (US); Serge Lucio, Belmont, MA (US); Monica Luke, Somerville, MA (US); John P. Whitfield, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/551,145

(22) Filed: Nov. 24, 2014

(65) Prior Publication Data

US 2015/0229556 A1 Aug. 13, 2015

Related U.S. Application Data

(63) Continuation of application No. 14/178,966, filed on Feb. 12, 2014.

(51) Int. Cl.
| | | |
|---|---|---|
| G06F 11/00 | (2006.01) | |
| G06F 11/36 | (2006.01) | |
| H04L 12/26 | (2006.01) | |
| H04L 29/08 | (2006.01) | |
| H04W 4/00 | (2009.01) | |

(52) U.S. Cl.
CPC ............ *G06F 11/36* (2013.01); *G06F 11/3664* (2013.01); *H04L 43/50* (2013.01); *H04L 67/10* (2013.01); *H04L 67/141* (2013.01); *H04W 4/005* (2013.01)

(58) Field of Classification Search
CPC . G06F 11/3364; G06F 11/36; G06F 11/3608; G06F 11/3668; G06F 11/3672; G06F 11/368; G06F 11/3696; H04L 43/50; H04L 67/141; H04L 67/10; H04W 4/005
USPC ............ 714/25, 26, 32, 33, 37, 38.1, 40, 47.1
See application file for complete search history.

(56) References Cited

U.S. PATENT DOCUMENTS

| | | | |
|---|---|---|---|
| 7,958,495 B2 | 6/2011 | Kelso | |
| 8,281,286 B2 | 10/2012 | Nguyen | |
| 2008/0010539 A1* | 1/2008 | Roth | G06F 11/3636 714/38.1 |
| 2011/0289489 A1 | 11/2011 | Kumar et al. | |
| 2013/0198568 A1* | 8/2013 | Ahmed | G06F 11/3688 714/32 |
| 2014/0123111 A1* | 5/2014 | Lee | G06F 11/3684 717/124 |
| 2015/0227452 A1* | 8/2015 | Raghavan | G06F 11/3684 717/124 |

* cited by examiner

*Primary Examiner* — Joseph D Manoskey
(74) *Attorney, Agent, or Firm* — Brian J. Colandreo, Esq.; Jeffrey T. Placker, Esq.; Holland & Knight LLP

(57) ABSTRACT

A method, computer program product, and computer system for defining, at a computing device, one or more channels for executing one or more test scenarios. One or more keyword keywords, each with one or more associated keyword implementations for at least one channel of the one or more channels, are defined. One or more test scenarios is defined, wherein at least one test scenario of the one or more test scenarios includes at least one keyword implementation of the one or more keywords.

6 Claims, 6 Drawing Sheets

DEFINING MULTI-CHANNEL TESTS SYSTEM AND METHOD

RELATED APPLICATIONS

The subject application is a continuation application of U.S. patent application with Ser. No. 14/178,966, filed on Feb. 12, 2014, the entire content of which is herein incorporated by reference.

BACKGROUND

With the explosive growth in popularity of smart mobile devices and other ways of accessing IT systems, businesses and developers that build and test their associated IT systems may find it useful to expand coverage and validate the growing numbers of ways users may access these systems. These different ways of accessing the same IT system and content may be viewed as different "channels" for dissemination of the same information. Testing of different channels may be handled by, e.g., defining different environments that may need to be tested, and then building unique test scripts for each environment.

BRIEF SUMMARY OF DISCLOSURE

In one implementation, a method, performed by one or more computing devices, may include but is not limited to defining, at a computing device, one or more channels for executing one or more test scenarios. One or more keyword keywords, each with one or more associated keyword implementations for at least one channel of the one or more channels, may be defined. One or more test scenarios may be defined, wherein at least one test scenario of the one or more test scenarios may include at least one keyword implementation of the one or more keywords.

One or more of the following features may be included. The at least one test scenario may be executed, wherein the at least one test scenario may include one or more keyword steps and at least one channel of the one or more channels. The at least one channel of the one or more channels may be specified external to the at least one test scenario. Testing each step in the at least one test scenario may include selecting the at least one keyword implementation based upon, at least in part, a relationship between the at least one keyword implementation and the at least one channel. The one or more keyword implementations may include a unique implementation for multiple channels. The at least one test scenario may include a plurality of channels. The at least one test scenario may include a weighting function based upon, at least in part, the number of steps that are to be run on each of the one or more channels.

In another implementation, a computing system includes a processor and a memory configured to perform operations that may include but are not limited to defining one or more channels for executing one or more test scenarios. One or more keyword keywords, each with one or more associated keyword implementations for at least one channel of the one or more channels, may be defined. One or more test scenarios may be defined, wherein at least one test scenario of the one or more test scenarios may include at least one keyword implementation of the one or more keywords.

One or more of the following features may be included. The at least one test scenario may be executed, wherein the at least one test scenario may include one or more keyword steps and at least one channel of the one or more channels. The at least one channel of the one or more channels may be specified external to the at least one test scenario. Testing each step in the at least one test scenario may include selecting the at least one keyword implementation based upon, at least in part, a relationship between the at least one keyword implementation and the at least one channel. The one or more keyword implementations may include a unique implementation for multiple channels. The at least one test scenario may include a plurality of channels. The at least one test scenario may include a weighting function based upon, at least in part, the number of steps that are to be run on each of the one or more channels.

In another implementation, a computer program product resides on a computer readable storage medium that has a plurality of instructions stored on it. When executed by a processor, the instructions cause the processor to perform operations that may include but are not limited to defining one or more channels for executing one or more test scenarios. One or more keyword keywords, each with one or more associated keyword implementations for at least one channel of the one or more channels, may be defined. One or more test scenarios may be defined, wherein at least one test scenario of the one or more test scenarios may include at least one keyword implementation of the one or more keywords.

One or more of the following features may be included. The at least one test scenario may be executed, wherein the at least one test scenario may include one or more keyword steps and at least one channel of the one or more channels. The at least one channel of the one or more channels may be specified external to the at least one test scenario. Testing each step in the at least one test scenario may include selecting the at least one keyword implementation based upon, at least in part, a relationship between the at least one keyword implementation and the at least one channel. The one or more keyword implementations may include a unique implementation for multiple channels. The at least one test scenario may include a plurality of channels. The at least one test scenario may include a weighting function based upon, at least in part, the number of steps that are to be run on each of the one or more channels.

The details of one or more implementations are set forth in the accompanying drawings and the description below. Other features and advantages will become apparent from the description, the drawings, and the claims.

DETAILED DESCRIPTION

Figure 1:
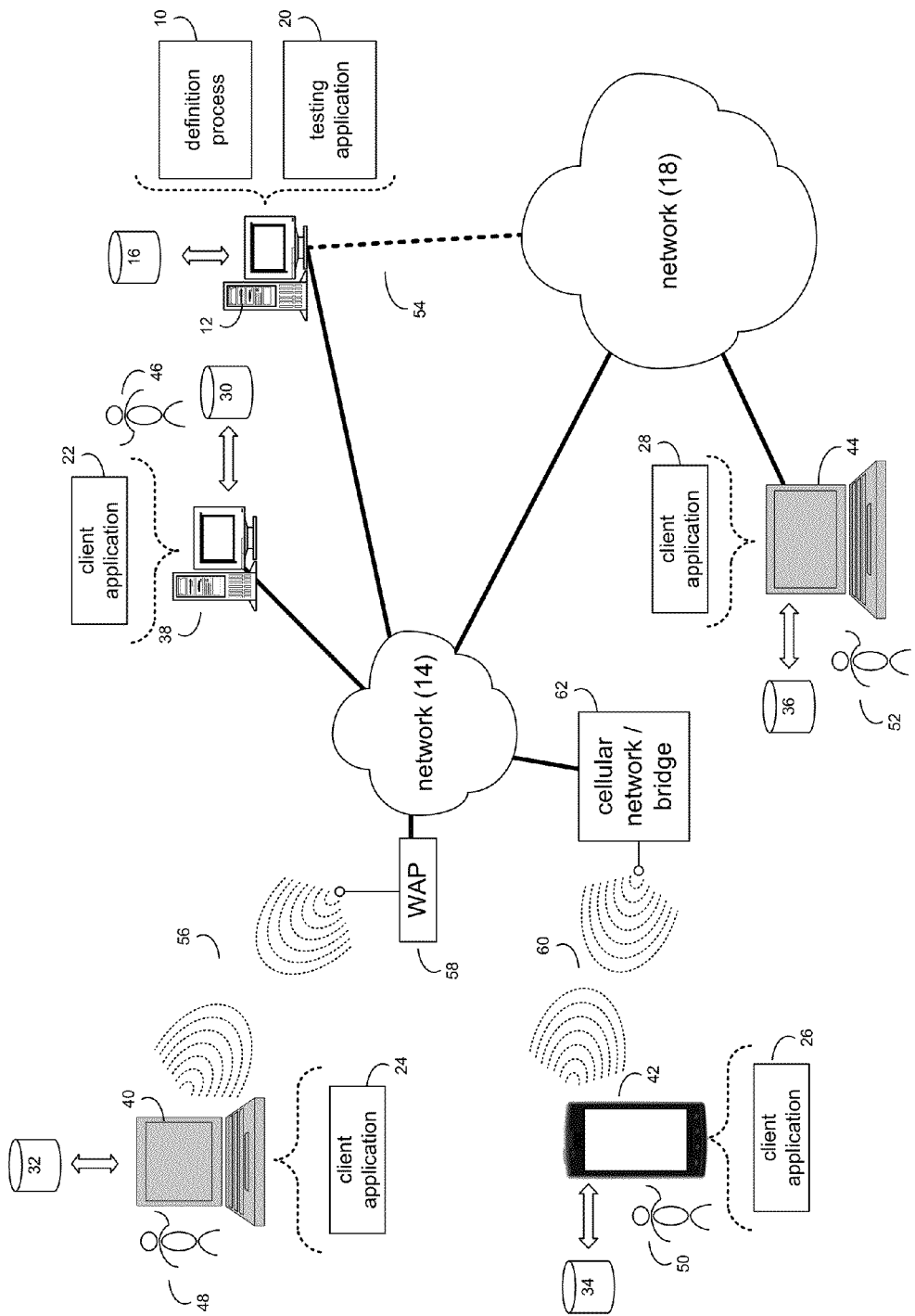
FIG. 1 is an illustrative diagrammatic view of a definition process coupled to a distributed computing network according to one or more implementations of the present disclosure.

System Overview:

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring to FIG. 1, there is shown definition process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be discussed below in greater detail, definition process 10 may define one or more channels for executing one or more test scenarios. One or more keyword keywords, each with one or more associated keyword implementations for at least one channel of the one or more channels, may be defined. One or more test scenarios may be defined, wherein at least one test scenario of the one or more test scenarios may include at least one keyword implementation of the one or more keywords.

The instruction sets and subroutines of definition process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, triplestore database, etc.) and may be located within any suitable memory location, such as storage device 16 coupled to computer 12. Any data described throughout the present disclosure may be stored in the data store. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Definition process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a testing application (e.g., testing application 20), examples of which may include, but are not limited to, e.g., a collaborative lifecycle management environment application for test scenario planning, construction, and execution, such as the kind offered by IBM Rational Quality Manager, or other application that allows for planning, constructing, and executing of a set of conditions or variables under which a tester will determine whether an application, software system or one of its features is working as it was originally established for it to do. Definition process 10 and/or testing application 20 may be accessed via client applications 22, 24, 26, 28. Definition process 10 may be a stand alone application, or may be an applet/application/script/extension that may interact with and/or be executed within testing application 20, a component of testing application 20, and/or one or more of client applications 22, 24, 26, 28. Testing application 20 may be a stand alone application, or may be an applet/application/script/extension that may interact with and/or be executed within definition process 10, a component of definition process 10, and/or one or more of client applications 22, 24, 26, 28. One or more of client applications 22, 24, 26, 28 may be a stand alone application, or may be an applet/application/script/extension that may interact with and/or be executed within and/or be a component of definition process 10 and/or testing application 20. Examples of client applications 22, 24, 26, 28 may include, but are not limited to, e.g., a collaborative lifecycle management environment application for test scenario planning, construction, and execution, such as the kind offered by IBM Rational Quality Manager, or other application that allows for planning, constructing, and executing of a set of conditions or variables under which a tester will determine whether an application, software system or one of its features is working as it was originally established for it to do, a standard and/or mobile web browser, an email client application, a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of definition process 10 (and vice versa). Accordingly, definition process 10 may be a purely server-side application, a purely client-side application, or a hybrid server-side/client-side application that is cooperatively executed by one or more of client applications 22, 24, 26, 28 and/or definition process 10.

One or more of client applications 22, 24, 26, 28 may be configured to effectuate some or all of the functionality of testing application 20 (and vice versa). Accordingly, testing application 20 may be a purely server-side application, a purely client-side application, or a hybrid server-side/client-side application that is cooperatively executed by one or more of client applications 22, 24, 26, 28 and/or testing application 20. As one or more of client applications 22, 24, 26, 28, definition process 10, and testing application 20, taken singly or in any combination, may effectuate some or all of the same functionality, any description of effectuating such functionality via one or more of client applications 22, 24, 26, 28, definition process 10, testing application 20, or combination thereof, and any described interaction(s) between one or more of client applications 22, 24, 26, 28, definition process 10, testing application 20, or combination thereof to effectuate such functionality, should be taken as an example only and not to limit the scope of the disclosure.

Users 46, 48, 50, 52 may access computer 12 and definition process 10 (e.g., using one or more of client electronic devices 38, 40, 42, 44) directly through network 14 or through secondary network 18. Further, computer 12 may be connected to network 14 through secondary network 18, as illustrated with phantom link line 54. Definition process 10 may include one or more user interfaces, such as browsers and textual or graphical user interfaces, through which users 46, 48, 50, 52 may access definition process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
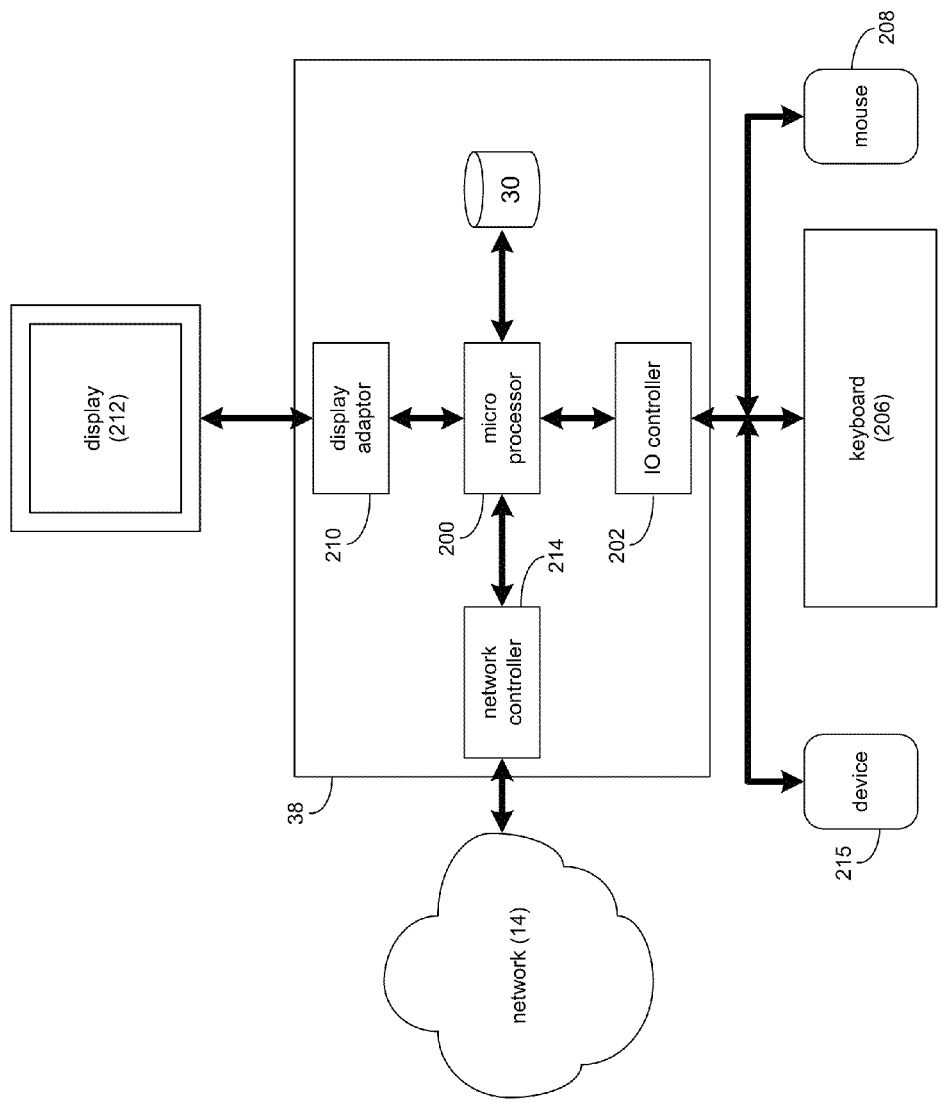
FIG. 2 is a diagrammatic view of a client electronic device of FIG. 1 according to one or more implementations of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, definition process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

Figure 3:
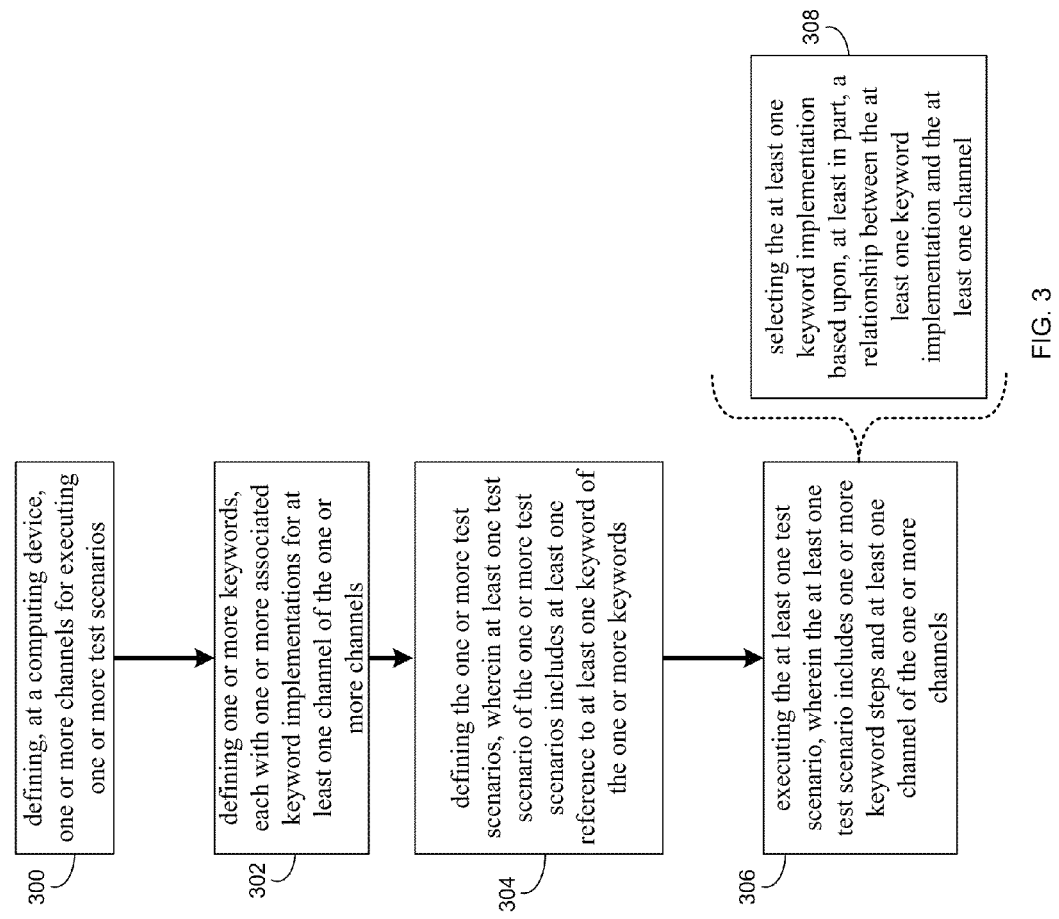
FIG. 3 is an illustrative flowchart of the definition process of FIG. 1 according to one or more implementations of the present disclosure.

The Definition Process:

As discussed above and referring also to FIGS. 3-5, definition process 10 may define 300, at a computing device, one or more channels for executing one or more test scenarios. Definition process 10 may define 302 one or more keywords, each with one or more associated keyword implementations for at least one channel of the one or more channels. Definition process 10 may define 304 one or more test scenarios, wherein at least one test scenario of the one or more test scenarios may include at least one keyword of the one or more keywords.

For instance, with the explosive growth in popularity of computing devices, e.g., such as the above-noted client electronic devices, and other ways of accessing Information Technology (IT) systems, those that build and test their associated IT systems may find it necessary to validate the growing numbers of ways users may access these system. These different ways of accessing the same IT system and content may be generally described as different "channels" for the delivery of the same information and services. For example, a user may log into a merchant website using a web browser on a traditional PC (first channel) while at work, check the status of an ordered item via a tablet "app" for the merchant (second channel), and decide to update the order from a different web browser of a smart phone at home (third channel). In some implementations, definition process 10 may facilitate testing different manners, or channels, of accessing an IT system or resources. For example, in some implementations, definition process 10 may allow such different channels for accessing an IT system or resource to be tested without building a unique test script for testing access of the IT system or resource via each distinct channel. In some situations, it may, therefore, be possible to test a wide range of access patterns, which may utilize different client electronic device platform and/or different web browsers or apps, in a comparatively less time consuming and more cost efficient manner.

In some implementations, to improve the coverage of testing such environments, definition process 10 may define 300, at a computing device (e.g., client electronic device 38), one or more channels for executing one or more test scenarios. In some implementations, the at least one channel of the one or more channels may be specified external to the at least one test scenario. For example, in order to run a test scenario, a channel must be specified via definition process 10, either when a test is executed or in advance, such as in a test execution record (which may contain other relevant data about the execution of a test scenario, such as in what test environment (e.g., specific device configurations) the test scenario will be/was executed, when the test scenario will be/was executed, by whom the test scenario will be/was executed, and what the results were if execution of the test scenario has been completed). For example, and referring at least to FIG. 4, an environment 400 shows a relationship between artifacts defined in, e.g., a test management tool (e.g., via testing application 20, definition process 10, client application 22, or combination thereof) that may define, e.g., multi-channel tests. As such, definition process 10 may, among other things, store information about how the testing is to be done, plan the testing activities and report the status of quality assurance activities. It will be appreciated that in some implementations, definition process 10 may not require either a test management tool and/or a test execution record. As such, the use of either a test management tool and/or a test execution record should be taken as an example only and not to limit the scope of the present disclosure. In some implementations, definition process 10 may include a user interface (not shown) that enables a user (e.g., user 46) to formally define 300 (e.g., via definition process 10) one or more channels for executing a test scenario. In general, a channel may include a particular combination of a client electronic device platform (such as a particular hardware device in combination with a particular operating system and/or operating system version) and a software application (such as a general purpose web browser or a special purpose application, or the like) that may be used to access a particular IT system and/or resource. In the example, three channel definitions are shown, e.g., for a Brand X tablet "app" (first channel 402), a Brand Y smart phone with a first browser (second channel 404), and a PC with a second different browser (third channel 406). It will be appreciated that any number of channels may be defined 300 by definition process 10 without departing from the scope of the present disclosure.

Figure 4:
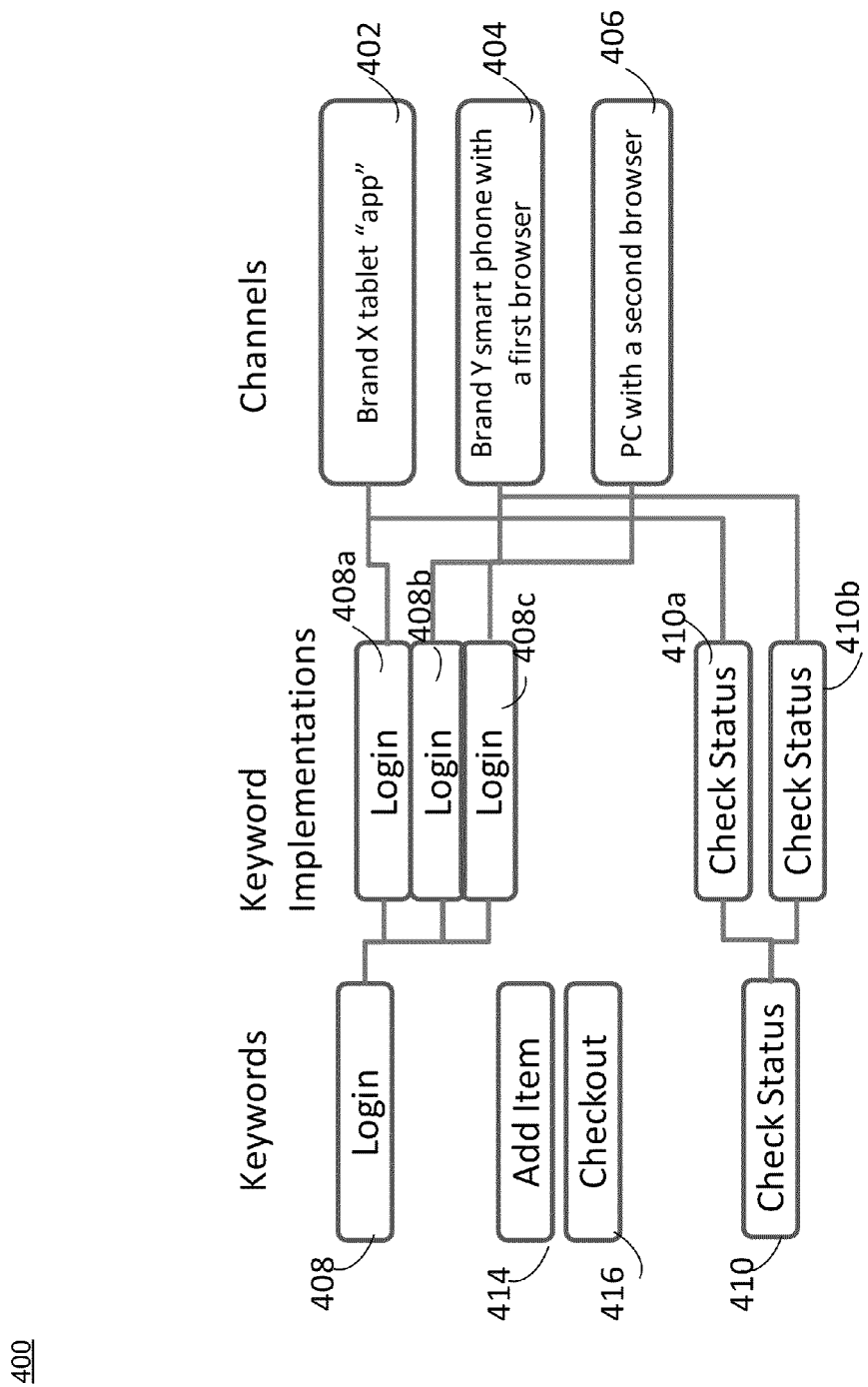
FIG. 4 is an illustrative diagrammatic view of a testing environment associated with the definition process of FIG. 1 according to one or more implementations of the present disclosure.

In some implementations, definition process 10 may define 302 one or more keywords, each with one or more associated keyword implementations for at least one channel of the one or more channels. For instance, and still referring at least to FIG. 4, assume for example purposes only that definition process has defined 300 each of first channel 402, second channel 404, and third channel 406. In the example, the high level test scenario(s) to be tested may be defined 302 (e.g., via definition process 10) by a sequence of keywords. For example, the keywords may abstract common functions, or test steps, (e.g., that may be performed relative to the IT system and/or resource) that tend to be re-used in multiple test scenarios. For instance, non-limiting examples of typical keywords (e.g., for an example shopping application) may include, e.g., "login", "find item", "add item to cart", "place order", "order status", and "cancel order". In some implementations, definition process 10 may include a user interface (not shown) that enables user 46 to define 302 (e.g., via definition process 10) one or more keyword implementations for at least one channel of the one or more channels. For instance, the example keyword implementations in the example of FIG. 4 include login 408a, login 408b, login 408c, check status 410a, and check status 410b. It will be appreciated that any number of keywords (and by association their associated keyword implementations) may be defined 302 without departing from the scope of the present disclosure. As shown, for example, in some situations a different keyword implementation for the "login" keyword may be defined 302 for each of the different channels (e.g., keyword implementation login 408a for channel 402, keyword implementation login 408b for channel 404, and keyword implementation login 108c for channel 406). In some situations a common keyword implementation may be defined 302 for more than one channel. For example, as shown in FIG. 4, keyword implementation check status 410a may be defined for channel 402, which keyword implementation check status 410b may be defined for both channel 404 and channel 406. It will be appreciated that any number of scenarios may be defined 304 with any number of keywords without departing from the scope of the present disclosure.

In some implementations, definition process 10 may define 304 the one or more test scenarios, wherein at least one test scenario of the one or more test scenarios may include at least one reference to at least one keyword of the one or more keywords. The keyword implementation(s) will be selected when the test scenario is executed, at which time the appropriate keyword implementation will be selected based on, e.g., at least in part, the channel specified at runtime or in the test execution record. For instance, and still referring at least to FIG. 5, assume for example purposes only that definition process 10 has defined 300 each of first channel 402, second channel 404, and third channel 406; defined 302 keywords login 408, add item 414, checkout 416, and check status 410; and keyword implementations login 408a, login 408b, login 408c, check status 410a, and check status 410b. In some implementations, definition process 10 may include a user interface (not shown) that enables user 46 to define 304 (e.g., via definition process 10) the one or more test scenarios. For instance, the example test scenario 511 defined 304 in the example of FIG. 5 includes 4 keywords (login 408, add item 414, checkout 416, and check status 410).

In some implementations, the one or more keyword implementations may include a unique implementation for multiple channels. For example, definition process 10 may support a unique implementation of the keyword for each channel and/or the ability to specify that an implementation supports multiple channels. For instance, and as generally mentioned above, in the example of FIG. 4, login 408 keyword may have unique implementations for each of the three defined 300 channels (e.g., 402, 404, and 406) and the 1-to-1 relationship is shown between each keyword implementation and the channel definition (e.g., 408a to channel 402, 408b to channel 404, and 408c to channel 406). As another example referring still to FIG. 4, check status 410 keyword may have two unique implementations, e.g., one for browser-based channels (e.g., check status 410b for channels 404 and 406), and a unique implementation for Brand X tablet apps (e.g., check status 410a for channel 402). That is, in the example, the browser implementation is related to both the Brand Y smart phone with a first browser (channel 404) and the PC with a second different browser (e.g., channel 406), where the Brand X specific implementation is related to the Brand X tablet app (channel 402).

Figure 5:
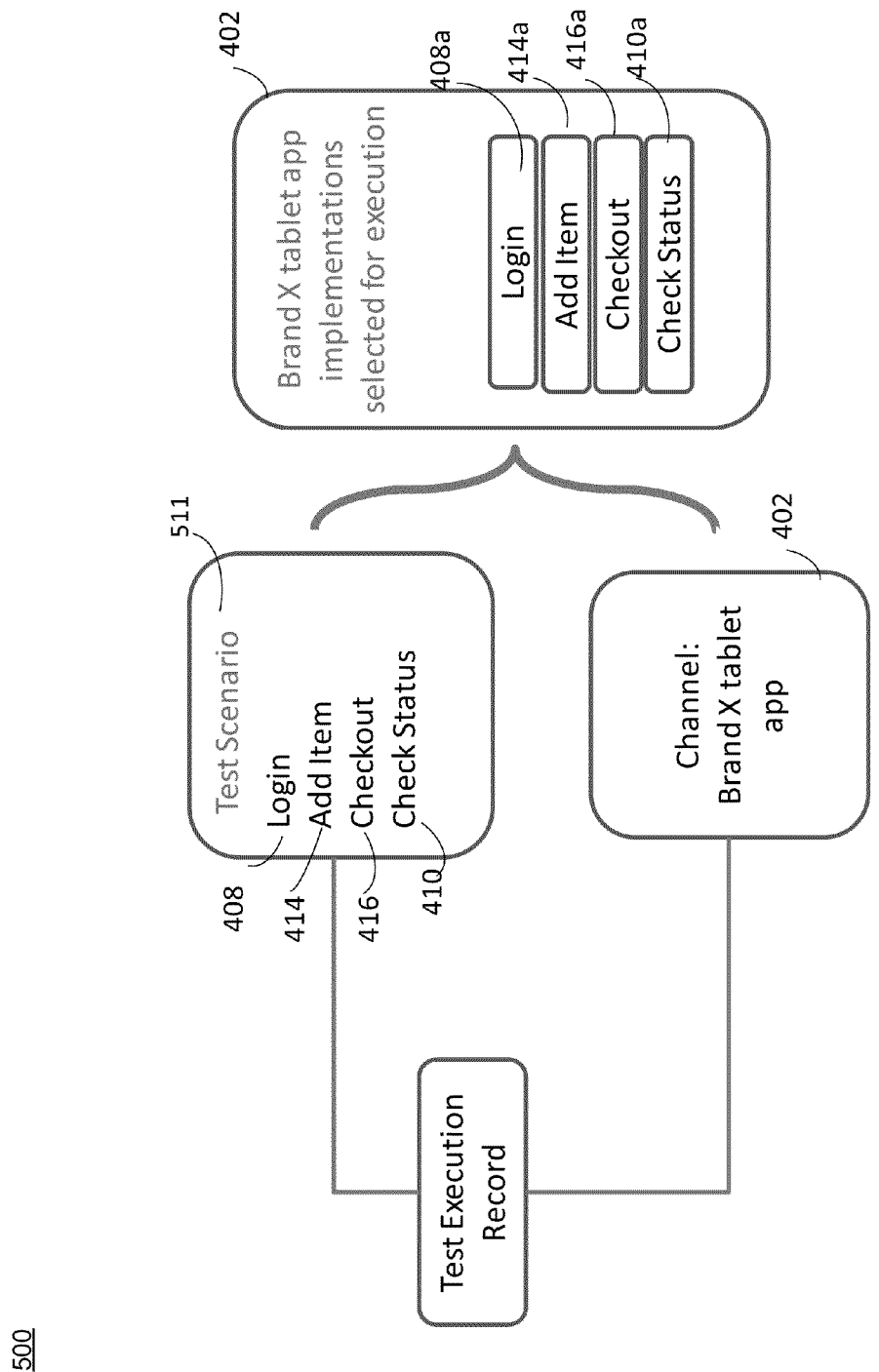
FIG. 5 is an illustrative diagrammatic view of a testing environment associated with the definition process of FIG. 1 according to one or more implementations of the present disclosure.

In some implementations, definition process 10 may execute 306 the test scenario, wherein the at least one test scenario may include one or more keyword steps and at least one channel of the one or more channels. Which channel is being tested may be defined 300 externally from the test. For example, and referring still to FIG. 5, with the defined channels, scenario, keywords and keyword implementations, definition process 10 may execute 306 a test using scenario 511 against one or more of the defined 300 channels. For instance, this is represented in the example FIG. 5 by the definition of a test execution record that may have a relationship to the test scenario 511 and Brand X tablet app (channel 402). In some implementations, executing 306 the test scenario may include definition process 10 testing each step in the at least one test scenario. For example, and still referring to the example FIG. 5, definition process 10 may test each step in scenario 511 (or one or more steps in scenario 511). In some implementations, testing each step in the at least one test scenario will include definition process 10 selecting 308 the at least one keyword implementation based upon, at least in part, a relationship between the at least one keyword implementation and the at least one channel. For example, definition process 10 may test each step in scenario 511 by selecting 308 the appropriate keyword implementation based on the relationships between the keyword implementations, and the specified channel definitions. For instance, as shown in FIG. 5, to test each step in scenario 511, definition process 10 may select 308 keyword implementations login 408a and check status 410a based upon the relationship between keyword implementation login 408a (and/or keyword implementation check status 410a), and channel 402. Thus, each of the steps tested in the example for scenario 511 based upon the relationship between keyword implementation login 408a (and/or keyword implementation check status 410a), channel 402, may include login 408 to login 408a to channel 402; and check status 410 to check status 410a to channel 402.

Figure 6:
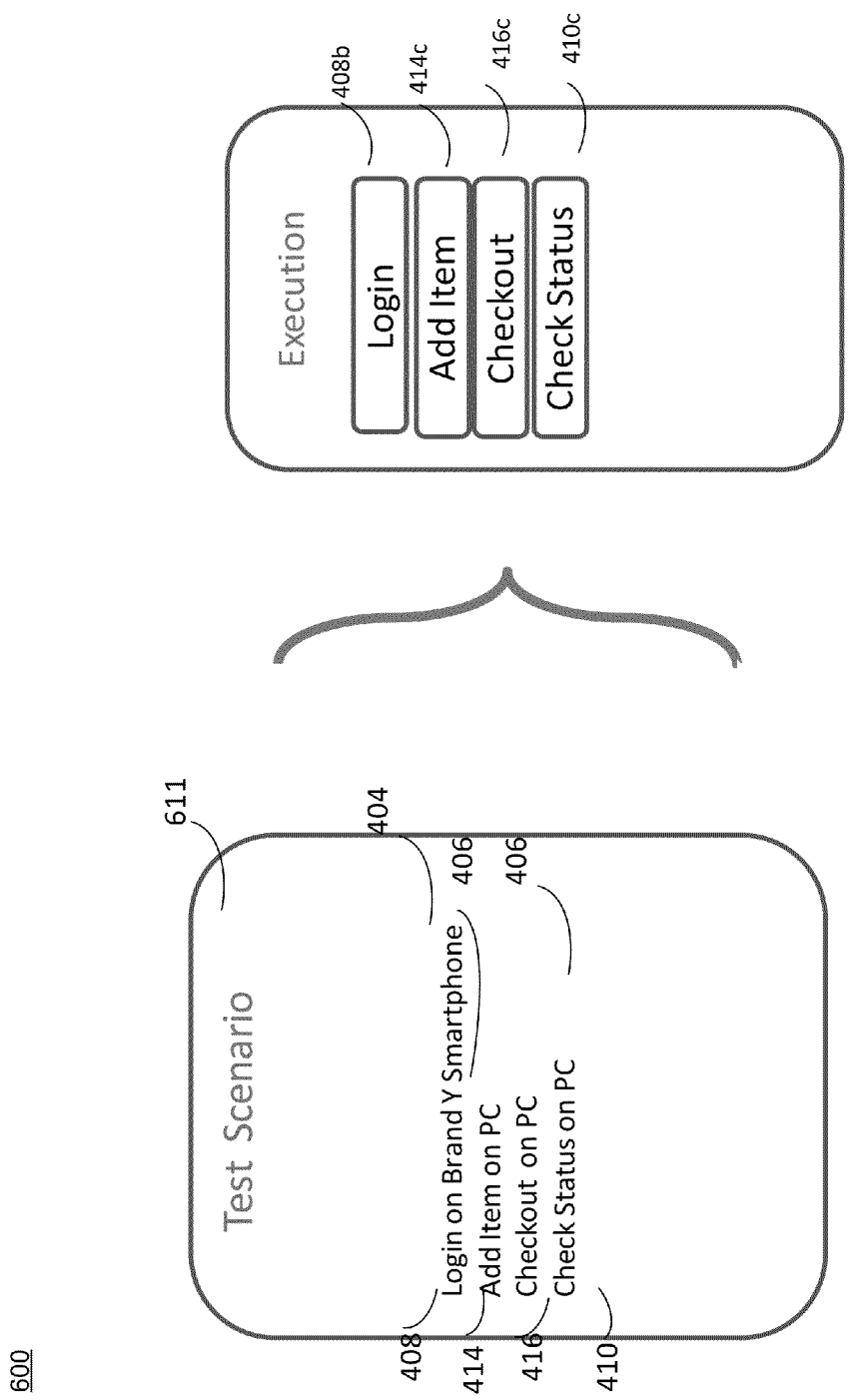
FIG. 6 is an illustrative diagrammatic view of a testing environment associated with the definition process of FIG. 1 according to one or more implementations of the present disclosure.

In some implementations, the at least one test scenario may include a plurality of channels. For instance, FIG. 6 shows a test scenario of this type is specifying the channel for execution of each step at the keyword itself. The ability to switch channels mid stream during the test scenario may be supported (e.g., via the above-noted UI), indicating a different channel for each step in the scenario. For example, and referring at least to environment 600 of FIG. 6, definition process 10 may define test scenario to reference multiple channels, such as channel 404 and channel 406, where during execution, the test scenario may touch multiple different channels. As such, in addition to each of the steps tested as described above for FIG. 5, definition process 10 may select 308 keyword implementations login 408b and check status 410c based upon the relationship between keyword implementation login 408b and channel 404, and keyword implementation check status 410c and channel 406. Thus, each of the additional steps tested in the example for scenario 611 based upon the relationship between keyword implementation login 408b (and/or keyword implementation check status 410c), channel 404, and test scenario, may include login 408 to login 408b to channel 404; and check status 410 to check status 410c to channel 406.

Since keywords may be reused in multiple test scenarios, and which channel is used may be defined 300 independently from the test scenarios, greater coverage may be achieved, as many permutations of channel usage may be designed and performed with reduced effort (e.g., through the use of defined keyword implementations for different channels). In the examples where a test scenario (including keywords) is completely executed on a single channel, the test execution record may be the container that specifies that channel. However, in some implementations, when a test scenario is executed across channels, the scenario itself may contain the information of which keywords are executed on a given channel. In some implementations, this type of example scenario is not reused across multiple channels, although it may also exist in that format.

In some implementations, and referring at least to the environment 500 of FIG. 5, definition process 10 may enable the testing of processes that span more than one channel. For example, assume that definition process 10 has defined the test scenario to reference multiple channels, such as channel 402 and channel 404. In the example, definition process 10 may enable the testing of environments where, e.g., a user may log into a merchant website using the Brand Y smart phone browser (e.g., channel 404) and check the status of an ordered item via the Brand X tablet "app" for the merchant website (e.g., channel 402).

In some implementations, the at least one test scenario may include a weighting function based upon, at least in part, the number of steps that are to be run on each of the one or more channels. For instance, definition process 10 may include a user interface (not shown) that enables user 46 to implement a weighting function (e.g., via definition process 10) to weight the number of steps that are to be run on any of the channels. For example, user 46 may desire to obtain more coverage of channel 402 as it may be associated with a more popular device than those associated with channels 404 and 406. Thus, in the example, definition process 10 may enable user 46 to implement a weighting function where, e.g., 50% of the steps included within scenario 511 are to be run for channel 402, 25% of the steps included within scenario 511 are to be run for channel 404, and 25% of the steps included within scenario 511 are to be run for channel 406. In an example of such a situation, definition process may implement the weighting function such that login step 408 and check status step 410 may be run for channel 402, while only login step 408 may be run for channels 404 and 406.

Thus, in some implementations, definition process 10 may use keywords to abstract test design and coverage to a series of (e.g., business) logic keywords. For every channel of interest for testing, these keywords may be implemented. These implementations may be manual and/or automated with any testing tool, e.g., of definition process 10. In some implementations, definition process 10 is not limited to GUIs, and a channel need not specify a UI type (e.g., it may include an API, HTTP, etc.). When an application changes, it is possible that only one implementation needs to be updated due to the application change, e.g., if the update is only on one channel (e.g., to a Web UI of channel 406 but not the Brand X tablet app of channel 402). Thus, definition process 10 may enable the isolation of differences in channel-specific implementations, and allows combination of the keywords in a channel-independent scenario.

In some implementations, the overall flow of the application may be changed impacting all channels. For instance, definition process 10 may update the above-noted test scenario once, e.g., to add/remove/reorder a keyword, to address the application change. As will be appreciated by one skilled in the art, this approach may be vastly superior to having to update separate test scenarios for each channel.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer-implemented method comprising:
defining, at a computing device, one or more channels for executing one or more test scenarios;

defining one or more keywords, each with one or more associated keyword implementations for at least one channel of the one or more channels; and defining the one or more test scenarios, wherein at least one test scenario of the one or more test scenarios includes at least one reference to at least one keyword of the one or more keywords, wherein the at least one test scenario includes a weighting function based upon, at least in part, the number of steps that are to be run on each of the one or more channels.

2. The computer-implemented method of claim 1 further comprising executing the at least one test scenario, wherein the at least one test scenario includes one or more keyword steps and at least one channel of the one or more channels.

3. The computer-implemented method of claim 1 wherein the one or more keyword implementations includes a unique implementation for multiple channels.

4. The computer-implemented method of claim 2 wherein the at least one channel of the one or more channels is specified external to the at least one test scenario.

5. The computer-implemented method of claim 4 wherein testing each step in the at least one test scenario includes selecting the at least one keyword implementation based upon, at least in part, a relationship between the at least one keyword implementation and the at least one channel.

6. The computer-implemented method of claim 1 wherein the at least one test scenario includes a plurality of channels.

\* \* \* \* \*